Oct. 14, 1952  H. J. KNAGGS  2,613,688
VALVE
Filed June 6, 1946  2 SHEETS—SHEET 1
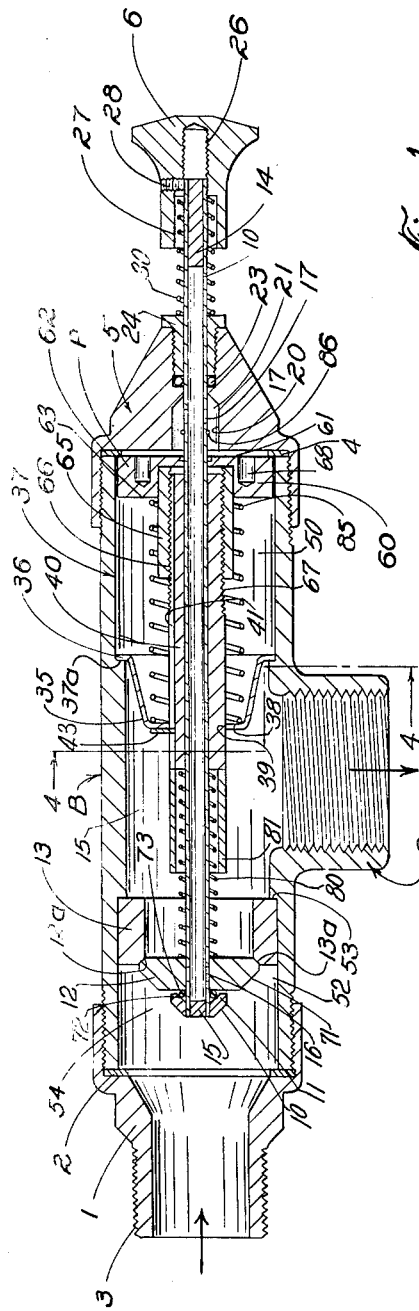
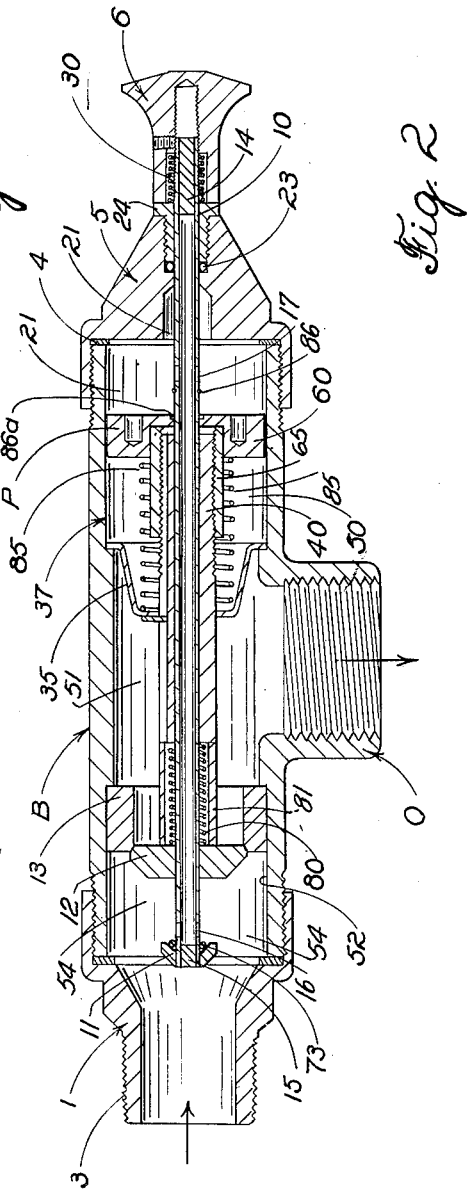
INVENTOR.
HAROLD J. KNAGGS
BY
ATTORNEYS Oct. 14, 1952 H. J. KNAGGS 2,613,688
VALVE
Filed June 6, 1946 2 SHEETS—SHEET 2
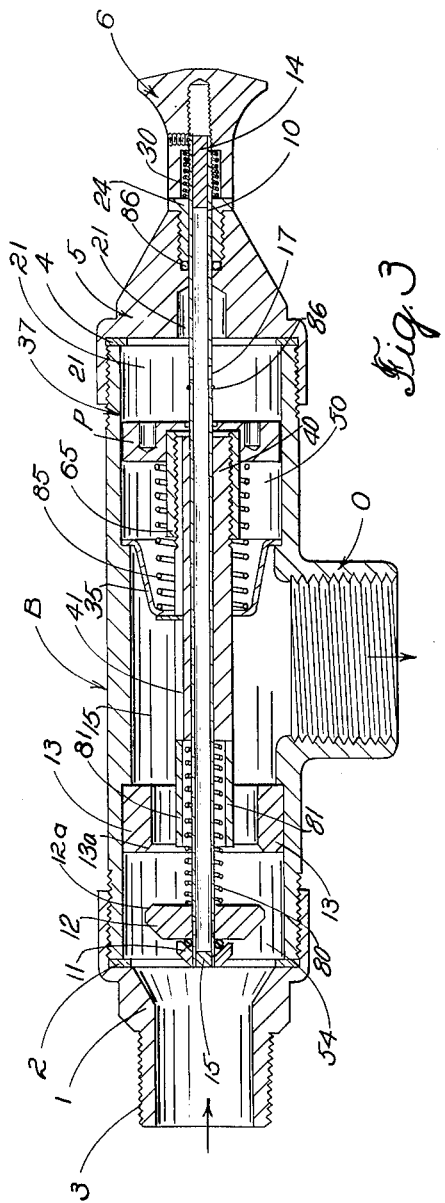
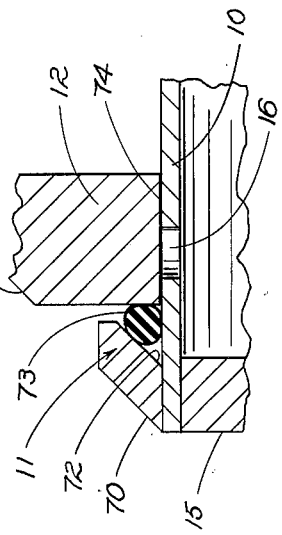
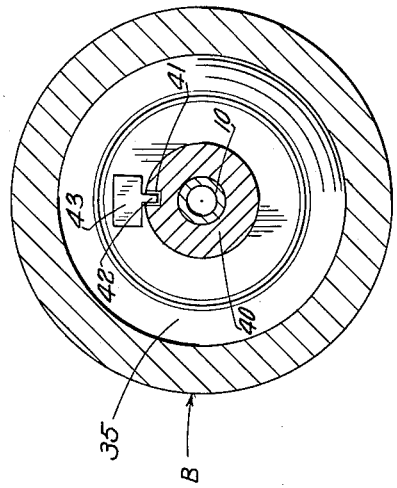
INVENTOR.
HAROLD J. KNAGGS
BY
ATTORNEYS Patented Oct. 14, 1952

2,613,688

UNITED STATES PATENT OFFICE 2,613,688

VALVE

Harold J. Knaggs, Sandusky, Ohio; Leah L. Knaggs, administratrix of said Harold J. Knaggs, deceased Application June 6, 1946, Serial No. 674,825

3 Claims. (Cl. 137—666)

This invention relates to valves, the art of controlling the flow of fluids and more particularly to self closing valves and improvements therein.

It is among the objects of my invention to provide a valve of the self closing type that will be dependable to perform its intended functions and will be adaptable and adjustable to operate satisfactorily under a wide range of various and varying conditions of fluids, pressures and demands. Another object is to provide a self closing valve having the above advantages that is simple and compact in construction, fool-proof in operation and capable of ready adjustment, replacement and repair. Another object of my invention is to provide a self closing valve that will be quick and positive in its response to manually initiated opening movement and be equally certain in its closing action. Another object is to insure long life and freedom from chattering, wire drawing, wear and the harmful effects thereof in a self closing valve. A further object is to provide a self closing valve the constituent parts whereof lend themselves to ease and economy of manufacture, assembly, adjustment and installation. A further object is to provide a self closing valve that is inherently free from self injury and deterioration in use and tends to be free from the deleterious effects of foreign or solid material entrained in the fluid stream controlled by the valve.

Other objects include that the times of discharge cycles may be readily adjusted and controlled wherewith to facilitate desired quantitative control throughout a wide range of fluid pressures encountered in different places and conditions of use. A more specific object is to control the movement of the valve closure member or disc at least through a large extent of its travel to and from its seat by adjustable resilient means wherewith to modify its rate of opening and closing movement. Another more specific object is to transmit the valve opening and closing forces as the same may originate manually and/or hydraulically, to the valve closure or disc through adjustably balanced springs which in their adjusted coaction will control the rate of valve movement wherewith to control the rate and quantity of flow with respect to line pressure, demand, viscosity and other extrinsic factors with which the device and user may be confronted. Another specific object is to adjustably control the stroke of the valve closure member or disc as well as the rate of movement thereof within its stroke. Another object is to provide a fluid motor to exert primary valve opening and closing forces and movements and to superpose upon the operation and effects thereof an adjustable control of the movement of the valve with respect to the motor through which this former may be caused to lead or lag the latter in desired and advantageous times and circumstances in the operating cycle.

Other specific objects include the provision of a novel coaction between the pilot valve and the main valve disc, improved control of fluid flow and pressure to and from the hydraulic motor that actuates the main valve, an improved mounting and assembly of the actuating parts, a parallelism of rigid and resilient means for actuating the main valve and a streamlining of the main and pilot valves in respect to fluid flow thereabouts.

Other objects and advantages will appear from the following description of a preferred form of my invention, reference being had to the accompanying drawings in which Figure 1 is a longitudinal sectional view of my valve with the parts in closed position; Figure 2 is a similar view with the parts in a mid-position of the opening stroke or cycle; Figure 3 is a similar view with the parts in a full-open position; Figure 4 is an enlarged transverse sectional view taken along the plane of the line 4—4 in Figure 1, and Figure 5 is an enlarged fragmentary longitudinal sectional view showing the relation of the pilot, seal, valve closure and stem.

As shown in the drawings the preferred form of my invention herein specifically illustrated and described comprises a hollow cylindrical body member B preferably having an integrally formed and internally threaded side outlet O. The body B at its forward end, leftward as viewed, is conveniently externally threaded wherewith to carry an end fitting 1 having fluid tight engagement therewith through a gasket 2 and in turn having external threads 3 wherewith to be joined to an external conduit or other source of fluid pressure, the flow from which is to be measured and controlled by my valve. The rightward or rearward end of the body B is preferably also externally threaded wherewith to receive in fluid tight relation with the gasket 4 the rearward cap member 5. Rightwardly as viewed, i. e., rearwardly of the cap, is disposed the operating button or knob 6 by the manual movement of which operation of the valve is initiated and, to a degree, controlled. As will more fully appear manual movement of the knob 6 forwardly, leftwardly as viewed, initiates the opening cycle of the valve. Forcible maintenance of the knob 6 in its foremost position, Figs. 2 and 3, maintains the valve in its open position, and release of the knob permitting freedom of movement to its rearmost or rightmost position enables or induces the valve closing cycle.

The operating knob 6 is attached to the right or rearward end of the main operating shaft or stem 10 which extends through the cap 5 and along the longitudinal axis of the valve body substantially throughout the whole length of the body, terminating at its leftward or innermost end in the pilot 11. Movement of the knob 6 is therefore directly reflected in movement of the pilot 11 which latter has control of hydraulic effects to be more fully described below that participate in the operation of the valve. Arranged co-axially of the stem 10 and the body B is the valve closure member or valve disc 12 adjacent the pilot 11, the valve seat member 13 with which the disc 12 coacts, and the main actuating piston P. The stem 10 is a hollow tubular structure affording an internal fluid passage throughout substantially its whole length being closed at its rightward end as at 14 adjacent the shank of the knob 6 and closed at its leftward or inner end as at 15 adjacent the pilot 11. The hollow stem 10 is ported as at 16 a short distance from the pilot 11 and is also ported in the region of the cap 5 and piston P as at 17 wherewith the stem 10 may serve as a fluid conduit between the ports 16 and 17 under conditions to be more fully described.

The cap 5 is counterbored as at 20 to a diameter substantially greater than the external diameter of the stem 10 wherewith to form an extension of the pressure chamber 21 affording a free fluid communication between the ports 17 and the rearward, i. e. pressure, face of the piston P when the stem is in its rearmost position, as shown in Figure 1. Rearwardly of the counterbore 20 the cap is drilled or bored to a diameter but slightly greater than the external diameter of the stem 10 wherewith to form a guiding bearing 22 within which the stem is slidably supported and maintained in coaxial alignment with the axis of the body B. Rearwardly of the bearing area 22 the cap is counterbored from its rear end and internally threaded wherewith to receive a gland or packing 23 and a packing nut 24 through which the stem 10 is slidable longitudinally in leakproof relationship to the fluid in the chamber 21. The rearmost and closed end of the stem 10 is preferably externally threaded wherewith to enter the internally threaded drilled hole 26 in the knob 6. As shown in the drawings the stem 10 has but partially entered the threads of the hole 26 whence the knob 6 may be adjusted longitudinally to the stem 10 from the position shown. The forward end of the knob 6 is preferably counterbored as at 27 to receive the rearward end of a spring 30 that lies coaxially of the stem and bears upon the nut 24 at is forward end whereby to resiliently urge the knob rearwardly away from the nut and cap with a yielding force adjustably determined by the spring and by the position of the knob on the stem through the threaded engagement therebetween. Preferably a set screw 28 passing through the knob behind the counterbore 27 is provided to engage the stem and secure the knob and stem in the desired adjusted relationship.

The stem being centered and guided near its rearward end in the bearing 22, I provide a second bearing and sliding support therefor internally of the body B in about the mid-portion thereof in the opening 39 in the bottom 38 of the cupped bearing and guiding member 35, see also Fig. 4, the flanged brim 36 of which is centered and bottomed in the coaxial counterbore 37 of the body against the shoulder 37a. Preferably the side walls of the cupped member 35 take the form of a truncated cone as shown and the bottom 38 is centrally apertured with a circular opening 39 coaxial of the stem 10 and body B wherewith to be in axial alignment with the bearing 22 and the valve seat 13. Preferably the peripheral margin of the flange 36 has a non-rotatably pressed fit in the counterbore 37. Interposed between the exterior of the stem and the interior of the sliding bearing 39 in the region of the latter is a sleeve 40 having an externally free close sliding fit in the bearing 39 and having internally a free close sliding fit with the exterior of the stem 10. Thus the stem in its longitudinal movement relative to the body B is accurately constrained to move coaxially thereof and the sleeve 40 in its mutual engagement with the bearing 39 and the stem is also constrained to have true coaxial motion with the body and stem in the manner and for the purposes to be described below. For reasons that will more fully appear I find it advantageous to restrain the sleeve 40 from rotational movement relative to the body B and the cupped bearing member 35 and to that end I prefer to form a longitudinal groove or spline 41, see also Fig. 4, along the exterior surface of the sleeve and to provide a guiding tang 42, preferably as a part of a separately formed T-shaped member 43 rigidly secured to the base of the cupped member 35 as by brazing or spot welding, with the tang 42 extending into the spline 41 and but partially filling the spline 41 whereby to prevent all but a limited rotational movement between the sleeve and the cupped member 35.

The cylindrical wall of the counterbore 37 at the rearward part of the body B defines the cylinder within which the piston P has its movement; the cylinder and piston serving as a fluid motor under the influence of fluid entering the chamber 21, and serving as a dashpot or fluid check under the influence of the spring 85 as will be more fully described below. The rearward portion of the body which includes the counterbore 37 may appropriately be called the piston chamber of the device. In its mid-portion the body B comprises a cylindrical central or outlet chamber 51, the interior surface of which may be cast in the first instance or drilled out if desired and from which the outlet O leads. The forward part of the body B is counterbored as at 52 to a shoulder 53. The valve seat member 13 is seated and located preferably as by a pressed fit within the counterbore 52 and against the shoulder 53. The counterbores 52 and 37 being coaxially aligned it follows that the seat 13 is coaxially aligned with the body B, stem 10, sleeve 40 and piston P.

For convenience the chamber 54 within the forward portion of the body and within the counterbore 52 thereof may be called the valve chamber. The valve disc 12 has its movement within the chamber 54 from the closed position shown in Figure 1 to the open position shown in Figure 3 relative to the seat member 13 and in aligned relation therewith since the closure member 12 is slidably supported by its close free sliding fit with the forward portion of the valve stem 10. Preferably the closure member 12 has a bevelled seating surface 12a coacting with the bevelled seat 13a of the seat member 13, the surfaces being appropriately formed or ground for sealing coaction therebetween when the parts assume the closed mating position shown in Figure 1.

Coaxial alignment of the major parts includes the association of the piston P with the sleeve 40. The piston P comprises a major thickened disc-like portion 60 having a rearward face 61 juxtaposed to the adjacent forwardly exposed portion of the cap 5, a cylindrical face 62 in spaced coaxial relation with the interior cylindrical surface of the counterbore 37 and a forward face 63. Rising from the central part of the forward face 63 of the piston and acting integrally therewith although preferably separately formed and secured by a pressed fit therein is a coaxial extension 65 having internal threads 66 in close threaded relationship with external threads 67 formed on the external surface of the sleeve 40. Preferably the rearward face 61 of the piston is drilled at spaced points as at 68 wherewith to receive a spanner wrench from the rearward end of the body (when the cap 5 is removed) to facilitate threaded adjustment between the piston and the sleeve 40 as well as threaded engagement therebetween. The piston preferably also has a portion 69 of its body adjacent its rearward face 61 extending inwardly to free sliding contact with the exterior surface of the stem 10. The piston P is therefore aligned with the stem 10 for coaxial movement with respect thereto and with respect to the longitudinal axis of the body and is secured to the sleeve 40 and adjustable longitudinally with respect to the sleeve 40 with which it has its movement. The clearance between the wall 62 and the adjacent surface of the counterbore 37 provide a primary bleed orifice from the chamber 21 to the space on the opposite side of the piston.

As suggested above the pilot 11 is secured at the extreme forward end of the stem 10, and as previously mentioned the forward end of the stem 40 is closed fluid tight by the closure 15. The pilot 11 preferably takes the form of the small relatively thick dished washer or annulus having its leftward or forward face beveled or rounded off as at 70 preferably in substantial continuation of the forwardly facing and bevelled exterior surface 71 of the valve disc 12 so that when the pilot and disc are lying together in about the middle of the chamber 54 in the full open position shown in Figure 3, they will together present to the stream a tapering or "streamlined" aggregate surface to lessen the resistance of the fluid passing thereby. The pilot 11 on its rearward surface preferably presents a concave conical face 72 within which there is preferably disposed an annular O-ring seal 73, see also Figure 5, which is compressed between the conical surface 72 of the pilot 11, the adjacent exterior cylindrical surface of the stem 10 and the adjacent radial plane surface of the valve closure member 12 when the pilot and disc are urged forcibly toward each other. As shown in Figure 5 when the parts are in sealing relation the ring 73 is compressed between the surfaces above mentioned sufficiently to prevent fluid under pressure from passing between the rearward face of the pilot and the forward face of the valve disc while maintaining those faces out of contact with each other and thereby preventing the flow of high pressure fluid from the chamber 54 into the ports 16 in the stem 10 which latter in the closed position, as shown in Figure 5, underlie the bore 74 of the disc 12. When the stem 10 is moved forwardly or leftwardly from the position of Figures 1 and 5 to and toward the position shown in Figure 2 the pilot 11 and seal 73 are carried forwardly and leftwardly as viewed away from the valve disc 12 thereby exposing the ports 16 to the high pressure fluid in the chamber 54 and permitting the ingress of high pressure fluid through the stem 10 with effects to be described below. When the valve disc 12 is advanced from its seated position shown in Figures 1 and 2 to its open position shown in Figure 3 it will reengage the seal 73 and cover the ports 16 in the stem 10, sealing off the ports with respect to fluid tending to enter from the direction of the seal 73.

Referring again to Figure 1 there is disposed between the rearward face of the closure member 12 and the forward end of the sleeve 40 a coil spring 80 which surrounds the stem 10. In this same portion of the mechanism and surrounding part of the spring 80 in its extended position shown in Figure 1 there is disposed a solid cylindrical sleeve 81, the rearward end of which contacts the forward end of the sleeve 40 and is located and spaced substantially coaxially of the stem 10 by its free support from the spring 80 which it encompasses. As shown in Figure 1 the sleeve 81 is preferably about half as long as the distance from the forward end of the sleeve 40 to the rearward face of the closure 12 as measured between the parts when the valve is in the closed position shown in Figure 1. While I prefer to make the sleeve 81 a separate cylindrical piece as above described for reasons which will more fully appear below, it is not without the function and operation of this sleeve that it be or act as the integral extension of the forward end of the sleeve 40, surrounding the spring 80 and affording a chamber within which the spring 80 may be preferably substantially wholly compressed as under the condition illustrated in Figure 2. The effective length of the sleeve 81 in relation to the distance between the forward end of sleeve 40 and the rear face of the disc 12 may be altered for adjustment of the operation of the valve either by substitution of sleeves 81 of different length or, in partial effect, by adjusting the sleeve 40 with respect to the piston P. Preferably the rate of build up of the spring 80 is such as to exert a relatively light force on the closure member 12 when the parts are in the position shown in Figure 1 with the spring in its distended position, but to exert a force preferably not sufficient to force the disc off the seat 13 against the effective pressure exerted upon the disc from the chamber 54 when the spring is substantially fully compressed and the parts have assumed the position shown in Figure 2. When the parts are in this position the disc may be first moved from the seat by direct thrust from the sleeve 81 whereupon the spring 80 "snaps" the disc along the stem to the position of Figure 3. The character or characteristics of the spring 80 as it enters into the mode of operation of my invention will be more fully discussed below; suffice it to say here that a range of control of the action of my valve is afforded as against different pressure heads encountered, different fluids and other operating conditions by selecting springs 80 of different inherent strengths, idle length, rate of build-up and the like on the one hand and by adjustment of the compression in the selected springs and selection of different lengths of sleeves 81 on the other hand.

Within the piston chamber 50 and interposed between the rearward face of the bottom of the cupped member 35 and the forward face 63 of the piston P is a coil spring 85 which in the position shown in Figure 1 exerts a desirable expansive force urging the piston rearwardly, i. e., rightwardly as viewed, to its extreme rearward position in the piston chamber 50. Forward movement of the piston, cf. Figures 2 and 3, compresses the spring 85. Preferably the build-up of the spring 85 is desirably small and I effect a diminution of such build-up to a desirable extent through the depth of the cupped member 35 wherewith the forward end of the spring 85 is spaced a relatively great distance away from the forward face 63 of the piston even when the piston is in a foremost position of travel substantially as shown in Figures 2 and 3.

As shown in Figure 1 the piston P is in its rearmost position of travel preferably bottoming on the inner marginal edge of the gasket 4 wherewith to leave a clear space on the working face 61 of the piston within the chamber 21. Under some conditions the relative movement of the piston rearwardly relative to the stem 10 is desirably constrained. For this purpose I provide a snap ring 86 which resiliently grasps an appropriate groove in the exterior surface of the stem 10 forwardly of the ports 17 and is receivable in the counterbore 86a but ordinarily lies a short distance from the plane of the working face 61 of the piston when the parts are in the position shown in Figure 1. On the one hand this ring prevents the ports 17 from being overlapped by the piston and/or the sleeve 41 wherewith to throttle the flow therethrough and on the other hand the snap ring 86 retains the piston and sleeve 40 within the body B when the cap 5 and the gasket 4 are removed from the body or prior to the assembly therewith. As mentioned above it is under such a condition that the piston may be threaded relative to the sleeve 40 and the snap ring facilitates this operation of assembly or adjustment by constraining the piston and associated parts from ejection from the piston chamber under the influence of the spring 85.

One of the advantages of my invention is the facility with which the parts can be made and assembled. Those skilled in the art will understand what appropriate materials may be employed with relation to the fluids to be handled by the valve. Such well known materials as the various brasses, bronzes, Monel metals, stainless steels and the like are appropriate for water valves and other materials have their appropriateness with respect to other fluids. Preferably the body B may be cast of appropriate material such as brass or bronze, machined and finished in the manner and for the purposes above described. The stem may well be a hollow brass tube to which the pilot 11 is brazed at the forward end, and the closure plugs 15 and 27 brazed interiorly at the opposite ends respectively. The valve disc and seats as well as the pilot, sleeves 81, 40 and 65 along with the piston P and even the cap 5 and packing nut 24 and knob 6 adapt themselves to screw machine production. The valve disc and seat may be made of Monel metal for example or other materials more advantageously adapted to the uses demanded of them. The cupped member 35 adapts itself to familiar drawing, forming, punching and shearing operations and the springs, snap ring and packing elements are readily procurable from the many and appropriate sources thereof.

Assuming the body B to be devoid of its fitting 1 and cap 5, assembly of the whole valve may appropriately begin with the pressing home of the seats 13 in the valve chamber 54 and the insertion and pressing home of the cupped member 35 with its peripheral flange snugly centered at the bottom of the counterbore as shown in Fig. 1. Thereafter the stem with the pilot secured thereupon may receive the O-ring packing 73, the valve disc 13, spring 80 and sleeves 81 and 40 as a sub-assembly and be inserted through the valve chamber 54, seat 13 and cupped member 35 to a position substantially as shown in Figure 1, due allowance being made for the idle distended length of the spring 80. Thereafter the spring 85 may be inserted from the rearward end of the body and the piston with its extension 65 threaded upon the rearward end of the sleeve 40 compressing the spring 85 as the piston is threaded up to and approaching the position shown in Figure 1. During the threading of the piston P on to the sleeve 40, the sleeve 40 may be constrained against movement leftwardly as viewed in Figure 1, as by manual pressure exerted upon the pilot 11 and the end of the stem 10 through the then open end of the valve chamber 54 since pressure will be transmitted to the sleeve 40 through the spring 80 sufficiently to maintain the sleeve 40 in a desirably accessible relation to the threads of the extension 65. The sleeve 40 being held against rotation so long as the tang 42 lies within the slot or spline 41. As the piston P is threaded on to the sleeve 40 and the spring 85 is compressed it may be convenient to force the piston inwardly relative to the stem 10 sufficiently to bring the snap ring 86 into its engagement with the groove of the stem adjacent the port 17 so that thereafter it will be unnecessary to exert any manual force rightwardly on the pilot, as viewed, to maintain the stem and its sub-assembly in its rearmost position with the valve disc on the seat. For considerations presently to be discussed in connection with the operation of the device the whole of the piston P need not necessarily be contained within the counterbore 37 of the body when the screwing of the piston on to the sleeve is desirably halted. The spring 85 among its other offices and functions serves by loading the threads 66 and 67 to hold the piston in fixed and desirably adjusted relation with respect to the sleeve 40.

When the partial assembly above described has been completed the fitting 1 with the gasket 2 may be readily attached to the front end of the body and the cap 5 of the gasket 4 threadably attached to the rear end of the body, the rearward end of the stem 10 then protruding through the bearing 22 of the cap 5. The packing ring and nut 24 may then be inserted and brought into the position shown in Figure 1 and thereafter the spring 30 and knob 6 suitably positioned and the latter threadably engaged with the rearmost end of the stem thus completing the assembly.

The valve being assembled as above described and as shown in Figures 1, 2 and 3 of the drawings and assuming the fitting 1 to be appropriately connected to the source of fluid pressure, the flow from which is to be controlled by the valve, and assuming that the outlet O leads to atmosphere or to a space at a lower pressure than the inlet pressure, opening of the valve is initiated by forward movement of the knob 6, with the accompanying movement of the pilot 11 away from the valve disc 12. Fluid under pressure is immediately admitted from chamber 54 to chamber 21 in the rear of the piston through the ports 16, stem 10 and the ports 17. The manual effort required to be exerted on the knob 6 to effect the initial movement of the pilot is the sum of the resistance of spring 30 and the pressure of the static head in chamber 54 against the pilot; this latter force is relatively small since the effective area of the pilot in the closed position does not greatly exceed the cross-sectional area of the stem 10 which may be of the order of about $\frac{5}{16}$ of an inch in diameter for installations employed with city water pressures that may range variously from 10 to 100 pounds per square inch. While the bore of the valve disc 12 has a free sliding fit around the stem 10 adjacent the ports 16 the seal 73 is preserved from wire drawing since the flow between the bore 74 and the stem 10 is restrained until the seal 73 is widely spaced from the adjacent face of the closure member 12. The space between the snap ring 86 and the face 61 of the piston P is such as to permit a wide exposure of the ports 16 before the ring 86 tends to engage the piston. The flow through the stem 10, once the ports 16 are open is preferably so rapid by virtue of the size of the ports and passage, in relation to the ordinarily encountered pressures in the chamber 54, that the piston will be moved forwardly by fluid pressure rather than by engagement with the ring 86 at least when the knob 6 is advanced with ordinary manual pressure and speed.

Thus as the knob 6 is advanced to the full end of its stroke into contact with the packing nut 24 the stem and pilot are advanced to their foremost position as shown in Fig. 2, whilst the piston P is advancing toward its foremost position, advancing the sleeves 40 and 81 forwardly as shown in Figs. 2 and 3 and compressing the springs 80 and 85. As shown in Figure 2 the hydrostatic pressure in the chamber 54 maintains the valve disc 12 on the seat against the increasing pressure of the spring 80 as the latter is compressed by the forward movement of the piston. When the parts are in the position shown in Fig. 2 or are approaching that position the forward end of the sleeve 81 is brought proximate to or in instances into contact with the valve disc 12, depending upon the adjustments which control the build-up of the spring 80, the relative length of the sleeve 81 and the pressure difference between the chamber 54 and the valve outlet. Thus the valve disc is moved from its seat either by the spring alone or by direct contact of the sleeve 81 with the disc. In either event it is a feature of my invention that directly on cracking the valve disc from the seat 13 the fluid pressure upon the disc urging it to a closed position tends to be largely or substantially offset by fluid pressure acting in the reverse direction on the back side of the disc so that substantially the whole compressed force of the spring 80 is released to advance the valve disc all the way from its closed or cracked position, substantially the position shown in Figure 2, to the limit of its travel where it engages the pilot 11 and seal 73 as shown in Figure 3, accomplishing a rapid, positive opening of the valve. In this way I avoid hanging, chattering or wire drawing as between the valve disc and the seat during the opening operation, getting a fast definite and full opening in a short interval of time and preserve a wide opening to the valve by the continued action of the spring 80 against the disc holding it in an open position for the intended interval.

Directly the valve disc 12 has been forced or snapped to its wide open position in engagement with the pilot 11, as shown in Figure 3, the ports 16 are substantially closed or throttled to the extent of the limited inflow that may be permitted between the bore 74 and the exterior surface of the stem thereby shutting off or greatly throttling the flow through the stem to the piston chamber 21 on the side of the working face of the piston. Meanwhile fluid that has entered the chamber 21 has been continuously bled through the clearance between the side face 62 of the piston and the adjacent surface of the counterbore 37 and in smaller degree has been permitted to bleed through the much restricted passage between the interior surface of the sleeve 40 and the exterior surface of the stem 10. The aggregate of this bleed from the chamber 21 is constrained by the restriction of the tolerances and clearances above described so that it is materially less than the inflow through the ports 16, when the latter are wide open, and the working pressure on the face of the piston 61 taken with its excess of area over the effective area of the valve disc 12 is ample to effect the opening of the valve and compression of the spring 85. When, however, the ports 16 are closed or restricted, as shown in Figure 3, then the aggregate bleed from the chamber 21 as induced by the action of the spring 85 forcing the piston rearwardly, will very materially exceed the small inflow that might take place through the ports 16 from between the bore 74 and the exterior of the stem 10 if the pressure thereabout should exceed the pressure in the piston chamber 21. Therefore the piston is induced to move rearwardly by the spring 85 at a rate determined by the force of the spring and the aggregate of the bleed through the clearances and tolerances above mentioned. Rearward movement of the piston and sleeve 40 reduces the forces compressing the springs 30 and 80 so that the valve closing influences upon the stem 10 and the valve disc 12 are apportioned between the springs 80, 85 and 30 which may be selectively and adjustably determined and predetermined by the choice of springs and by the adjustments thereof. The adjustment and effect of these springs taken with the adjustment of the stroke of the stem and pilot and the size of the net bleed orifice from the chamber 21 permits me to meet substantially any operating condition and obtain desirable results.

As we have seen the opening cycle of operation of the valve concludes with a "snap movement" of the disc 12 from its seat to its position of engagement with the seal 73 and a substantial closing of the ports 16 where the disc is held by the spring 80 throughout the discharge cycle next to be described. The length of the stroke or longitudinal travel of the valve disc is commensurate with the stroke of the stem 10 as adjustably determined by the position of the knob 6 on the rearward end thereof. At the end of the opening cycle the spring 30 is fully compressed within the knob 6 as shown in Figure 3; the spring 85 is at its state of maximum compression for the cycle and the spring 80 is in its state of compression, as shown in Figure 3, greater than the state shown in Figure 1 and less than the state shown in Figure 2, depending on the factors mentioned above and more particularly upon the length of the stroke, the relative length of the sleeve 81 and the adjustment of the piston relative to the sleeve 40. The time consumed in the whole of the opening cycle is readily maintained desirably small largely by the freedom of flow obtained through the ports 16 to the compression chamber 21 wherewith to advance the piston at least about as rapidly as modest manual effort will advance the knob 6 through its limited stroke. The actual opening of the valve in the sense of movement of the disc 12 is substantially instantaneous.

Time as a factor in the closing cycle measures the quantity of outflow per cycle regard being had for the inlet pressure or more particularly the differential between inlet and outlet pressure. Thus when it is desired to cause the valve to discharge a specific quantity per cycle as against specific inlet and discharge pressures, adjustment of the length of time of the discharge cycle will provide the desired quantity.

The discharge cycle begins with the closing of the ports 16 whereupon the piston P and the cylinder 50 are converted from, in effect, a fluid motor into a dashpot or hydraulic check; the spring 85 thereupon exerting its maximum effort to move the piston and sleeve 40 rearwardly against the hydraulic resistance of the fluid escaping from the chamber 21. At this time the spring 30 acting through the stem and pilot on the disc 12 and the effect of fluid impinging on and flowing over the disc and pilot are tending to close the valve, but the spring 80 being compressed between the sleeve 40 and the disc 12 is tending to maintain the valve open. Rearward movement of the sleeve 40 with the piston permits the distention of the spring 80 until it exerts no greater force forwardly on the disc 12 than the spring 30 and fluid pressure exert rearwardly thereupon. This may be deemed the first phase of the discharge cycle and is characterized by rearward movement of the piston while the disc and pilot remain unmoved in their foremost position. This first phase concludes when the forces tending to hold the disc and pilot forwardly are overbalanced and rearward movement of the disc and pilot begins. The relative length of this phase of the cycle may be adjustably influenced by, inter alia, the length of the stroke of the stem, the selected character and adjustment of the spring 30, and the character and adjusted build-up of the spring 80 as the latter may be adjusted by the relative adjustment between the piston and the sleeve 40 and the relation of the spring 80 to the length of the sleeve 81.

That this first phase of the discharge cycle shall exist at all is based on the assumption that the spring 80 in its partially compressed state, as shown in Figure 3, does in fact exert a greater forward force upon the valve disc than does the spring 30 in its compressed condition shown in Figure 3. If in the wide open position, Figure 3, the forces of the spring 30 and 80 are just in balance, or if the force of spring 30 with the fluid pressure on the disc and pilot should then exceed the force of spring 80, then the first phase as above denominated will be eliminated from the whole closing cycle. If the spring 30 in its fully compressed position, Figure 3, should at the instant of release of manual pressure upon the knob 6 have exerted a greater rearward force upon the stem, pilot and disc than did the spring 80 exert a forward force, then the stem, pilot and disc will move rearwardly until the spring 80 is compressed enough to balance the spring 30 and the net fluid pressure on the disc and pilot wherever that state of balance may be achieved in respect to the position of the disc relative to the seat.

Before passing from consideration of this first phase of the closing cycle it may be appropriate to mention that when the parts are in the state shown in Figure 1 with the springs 30 and 80 normally distended, it is desirable that the spring 80 exert a lesser influence tending to open the valve than does the spring 30 exert tending to close the valve. That is to say, if the spring 80 succeeded in opening the valve against inlet pressure or a failure thereof, or if the spring 80 prevailing over the spring 30 and fluid pressure prevented the valve from closing, the valve would tend to stay open until manually closed by the knob 6. The aggregate of inlet pressure upon the pilot and disc taken with the spring 30 will, when the piston has moved rearwardly, maintain the valve closed so long as such aggregate of such forces exceeds the force of the spring 80 as shown in Figure 1. It will also be appreciated that if the spring 80 were to build up to exert a force upon the disc 12 sufficient to open it prematurely near the beginning of the intake cycle that such a premature action would close the ports 16 and thereby stop the forward movement of the piston. Therefore I prefer that the spring 80 be so selected and adjusted with respect to the differential pressure across the disc 12 in its closed position that the spring 80 will not exert a force sufficient to move the disc 12 from its seat prior to the completion of the desired lengths of forward strokes of the stem and the piston through which the desired time and character of closing cycle will be obtained.

The second phase of the closing cycle is characterized by the net balance reflected through the springs 30 and 80 upon the disc, pilot and stem. Directly this state of balance is achieved then the disc, pilot and stem move rearwardly substantially at the rate of rearward movement of the piston, regard being had for the relative change in influence of the several springs as the same become increasingly extended to approach their state of maximum distention shown in Figure 1. The time consumed in this second phase of the closing cycle is controlled as to the rate of movement of the parts by the dashpot action of the piston P in the cylinder 50 under the influence of the spring 85 and the influence of fluid pressure on the disc and pilot transmitted to the piston through the spring 80 and sleeve 40, regard being had for the distance through which the disc, stem and pilot must travel during this second phase of the closing cycle, which in turn is influenced by the length of the initial stroke of the stem as adjusted by the position of the knob 6 thereon. For convenience of description I prefer to designate the end of this second phase of the closing cycle as characterized by the time when the state of balance between the springs terminates as it does about an instant prior to contact between the disc and the seat. That is to say, as the disc is carried rearwardly and approaches the seat the pressure differential as measured across the valve opening tends to increase rapidly and since the disc, pilot and stem are held away from the seat largely in a state of spring balance, the change in pressure differential is relatively free to effect a quick closure with the desirable avoidance of wire drawing, chattering, hammering and the like.

When dealing with high inlet pressure relative to outlet pressure the fluid effects upon the disc and pilot will tend to initiate the last step of moving the disc to the seat when the disc is farther from the seat than when lower inlet, relative to outlet, pressures are encountered. In the first instance however the spring 80 will have been more highly compressed in resisting the higher inlet pressure during the preceding closing phases of the cycle and thus more resistant to this last increment of disc closing movement than in the second instance. Thus the spring resists undesirable slamming of the disc onto the seat by high inlet pressure while permitting desirable quick closing movement under relatively low inlet pressure. When the pressure on the rearward side of the disc reaching the ports 16 between the bore of the disc and the surface of the stem becomes less than the pressure in chamber 21, bleed therefrom is enhanced as by a reversal of flow if, as I believed, a non-bleeding flow has been transpiring from the beginning of the discharge cycle until the time the pressure on the rearward side of the disc falls below the pressure in the chamber 21. In all events this enhancement of the bleed from the chamber 21 whether great or small in degree enhances the rearward movement of the piston to complement the effects which aid in the quick and positive closing of the valve at or substantially at the end of the second phase of the discharge cycle.

There remains a third phase of the discharge cycle in which the piston completes any unfinished part of its rearward stroke. To be on the side of safety I prefer that this third phase be of measurable time albeit such time is without the compilation of time within which fluid flows through the valve. Preferably the piston will have a modest fraction of its travel remaining at the end of the second phase of the discharge cycle so that in the third phase it may travel about at least 10% of its stroke and effect the ultimate distention of the springs 80 and 85 for their desired condition to be ready for the initiation of the next opening of the valve.

Within the above described operations it will be observed that the piston P will have considerable movement independently of the movement of stem 10. Factors governing the correlation and independence of movement of these parts have been discussed above. I am not unmindful of the fact that the stem and piston may at times have mechanical engagement through the ring 86 wherewith to move together. Preferably the ring 86 is spaced far enough away from the piston and the bottom of the groove 86a to permit the full effective opening of the ports 16 at the beginning of the opening cycle before the ring engages the piston. Engagement thereafter in the opening cycle merely adds manual pressure from the knob to the piston to aid its forward movement until the knob contacts the nut 24. Withal fluid pressure in the chamber 21 has its primary effect in moving the piston throughout the opening cycle independently of stem movement.

At the beginning of the closing cycle the space between the piston P and ring 86 will be influenced by the length of the stroke of the stem and the extent of the overtravel of the piston relative to the stem as influenced by the considerations above discussed. If the spacing at that time is relatively small and the action of the parts and forces is such as to cause the piston to overtake the ring on its backstroke, then for the time the piston contacts the ring a portion of the effort of the spring 85 will tend to supplement the effort of the spring 30 to move the stem rearwardly. It is not impracticable to provide more than one groove for the ring 86 so that the position of the ring on the stem may be selectively determined wherewith to tend to have greater or lesser periods of contact with the piston as conditions of operation may advantageously warrant.

Consideration of the operations above described and the influences and coaction of the several elements and factors therein shows the wide range of adaptability and utility of my valve. Within such considerations it may be generalized that the length of the piston stroke correspondingly influences the length of the discharge cycle and the quantity to be discharged with relation to the difference between inlet and outlet pressures. The character of the spring 80 considered with the relative length of the sleeve 81 and the adjustment of the piston with respect to the sleeve 40 influences the length of the piston stroke. On the one hand if the sleeve 81 were shorter than the fully compressed length of the spring 80 the initial movement of the disc from the seat would be induced either when the compression of the spring 80 exceeded the fluid pressure which holds the disc on the seat or when the force of the fluid motor is transmitted through the fully compressed spring directly to the disc. On the other hand the length of the sleeve 81 may substantially exceed the fully compressed length of the spring 80, as suggested in Figure 2, or in greater degree with the result that the disc will be positively moved from its seat by direct contact with the sleeve 81 at a great or little time prior to the time when the spring 80 would be sufficiently compressed to overcome the fluid pressure on the disc. The earlier in the opening cycle the disc is moved from the seat the shorter will be the stroke of the piston and thus to the extent that the length of the piston stroke measures the time of discharge so may that time be influenced to be reduced by the relatively early initiation of the opening of the valve relative to the forward movement of the piston.

It may also be said as a working generality that the length of the stroke of the stem and pilot will have a roughly proportionate influence on the length of the discharge cycle. Thus we may take it as a guide in adjusting and adapting the valve to varying conditions of use that a greater quantitative discharge for a given fluid pressure differential will follow the enlargement of both the piston stroke and the stem stroke, and, conversely, restricting either or both of these strokes will tend in the direction of shortening the discharge cycle and, for a given differential pressure, the quantity of fluid discharged per cycle.

When it is desired that particular quantities of fluid be discharged per cycle as against different pressure differentials encountered in different installations the valve may be correspondingly adjusted by the means specifically taught and generally suggested herein to make appropriate adjustments and compensations, not only in the gross time of discharge but also in apportionment between the first and second phases of the discharge cycle as may be most expedient for the character of operation desired having regard for the different inherent qualities of springs that may be conveniently employed in a particular valve or that may have been employed in one valve in one installation prior to its need for adaptation or use in a subsequent installation. Within these considerations it will be appreciated that a wide range of adjustment may be achieved by mere positioning of the knob on the threaded end of the stem wherewith to change the stroke of the stem and the "pre-compression" of the spring 30. Since such adjustment may be done in the simplest manner the facility of utility of my valve is correspondingly enhanced.

While I have illustrated and described a preferred and certain modified forms of my invention, changes, other modifications and improvements therein will occur to those skilled in the art who become familiar with the teachings hereof without departing from the spirit and substance of my invention, and I do not care to be limited in the scope of my patent to the forms herein specifically illustrated and described or in any manner other than by the claims appended hereto.

I claim:

1. In a self closing valve, a power actuated main valve, a fluid motor for actuating said main valve, resilient means adapted to exhaust said motor after actuation of said valve, second resilient means tending to maintain said valve open during the exhausting of the motor, and a third resilient means opposed to said second resilient means adapted to close said main valve when said motor has been exhausted a determinable amount.

2. In a self closing valve, a power actuated main valve, a fluid motor for actuating said main valve, a first resilient means for transmitting the force of said motor to said main valve, a pilot valve for admitting fluid under pressure to said fluid motor, said main valve adapted to close said pilot valve upon responding to said first resilient means, a second resilient means adapted to exhaust said motor after actuation of said main valve, said first resilient means alone maintaining said valve in open position during the exhausting of said motor, and a third resilient means adapted to close said main valve when said motor has been exhausted a determinable amount.

3. A self closing valve comprising a body having a valve chamber at one end and a piston chamber at the other end with an outlet port therebetween, a stem extending through and coaxially of said body, a cap closing said piston chamber and slidably supporting said stem, a piston in said piston chamber and slidably supporting said stem, means carried by said body between said chambers slidably supporting said piston, a main valve seat located in said valve chamber, a main valve closure member slidably supported on said stem, said stem comprising a fluid conduit with ports adjacent to said closure and piston members and providing means responsive to stem movement to actuate said piston and thereby said main valve, a spring means acting between said piston and said closure member, a second spring means acting between said means and said piston and a third spring means acting between said cap and said stem, said first spring means acting to transmit force from said piston to said closure member to actuate the valve, and to hold said closure member open during the exhausting of said motor, said second spring means acting to exhaust said motor, and said third spring means acting to immediately close said valve when said motor has been exhausted a determinable amount.

HAROLD J. KNAGGS.

REFERENCES CITED

The following references are of record in the file of this patent:

UNITED STATES PATENTS

| Number | Name | Date |
|---|---|---|
| 312,077 | Bowen | Feb. 10, 1885 |
| 759,530 | Kelly | May 10, 1904 |
| 873,766 | Matson | Dec. 17, 1907 |
| 1,218,567 | Kellan | Mar. 6, 1917 |
| 2,301,409 | Iversen | Nov. 10, 1942 |
| 2,361,773 | Knap | Oct. 31, 1944 |

FOREIGN PATENTS

| Number | Country | Date |
|---|---|---|
| 341,998 | France | of 1904 |